(12) United States Patent
Yoshida et al.

(10) Patent No.: US 7,532,280 B2
(45) Date of Patent: May 12, 2009

(54) LIQUID CRYSTAL DISPLAY DEVICE

(75) Inventors: Keisuke Yoshida, Yamatokoriyama (JP); Ichiro Shiraki, Matsusaka (JP); Shingo Jogan, Kyoto (JP); Hirofumi Katsuse, Tokyo (JP)

(73) Assignee: Sharp Kabushiki Kaisha, Osaka (JP)

( * ) Notice: Subject to any disclaimer, the term of this patent is extended or adjusted under 35 U.S.C. 154(b) by 316 days.

(21) Appl. No.: 10/585,887

(22) PCT Filed: Jul. 13, 2005

(86) PCT No.: PCT/JP2005/012920

§ 371 (c)(1),
(2), (4) Date: Jul. 12, 2006

(87) PCT Pub. No.: WO2006/009034

PCT Pub. Date: Jan. 26, 2006

(65) Prior Publication Data

US 2007/0242196 A1 Oct. 18, 2007

(30) Foreign Application Priority Data

Jul. 20, 2004 (JP) ............................. 2004-212327

(51) Int. Cl.
*G02F 1/1335* (2006.01)

(52) U.S. Cl. ........................ 349/114; 349/110; 349/113

(58) Field of Classification Search ........................ None
See application file for complete search history.

(56) References Cited

U.S. PATENT DOCUMENTS 6,958,793 B2 * 10/2005 Koyama ..................... 349/113
2004/0135946 A1   7/2004 Koyama

FOREIGN PATENT DOCUMENTS

| JP | 11-316382 | | 11/1999 |
| JP | 2000187220 | A * | 7/2000 |
| JP | 2004-20688 | | 1/2004 |
| JP | 2004-77544 | | 3/2004 |

OTHER PUBLICATIONS

International Search Report of PCT/JP2005/012920, mailed Oct. 25, 2005.

* cited by examiner

*Primary Examiner*—Michelle R Connelly Cushwa
(74) *Attorney, Agent, or Firm*—Nixon & Vanderhye P.C.

(57) ABSTRACT

In a multi-gap semi-transmissive liquid crystal display device, the width of a black matrix (6) is made larger above the region between adjacent ITO transparent electrodes (3) and is made smaller above the region between adjacent Al reflective electrodes (4). This enables a transmissive portion to offer a display with high contrast that does not suffer from afterimage or the like by shielding light from the domain lying between the adjacent pixels, and the reflective portion to offer a brighter display by increasing the aperture ratio thereof by making the black matrix width as small as possible or forming no black matrix.

24 Claims, 8 Drawing Sheets

LIQUID CRYSTAL DISPLAY DEVICE

This application is the US national phase of international application PCT/JP2005/012920, filed 13 Jul. 2005, which designated the U.S. and claims priority of JP 2004-212327, filed 20 Jul. 2004, the entire contents of each of which are hereby incorporated by reference.

TECHNICAL FIELD

The present invention relates to an active-matrix liquid crystal display device that offers transmissive and reflective displays, and more particularly to a liquid crystal display device such as a cellular phone or a car navigation system that is provided with a medium or small sized high-definition monitor (a liquid crystal display panel, a liquid crystal display element).

BACKGROUND ART

Since the conventional liquid crystal display devices are thin and consume a low amount of power, they find wide application in a variety of field including portable electronic information apparatuses such as cellular phones, and help spawn new markets.

However, market requirements are accordingly increasingly demanding year after year, and, with the advent of contending technologies such as electroluminescence (EL) or electronic paper, liquid crystal display devices are required to offer an advantage of their own and high display quality. It is under this background that semi-transmissive liquid crystal display devices, in particular, have been keenly sought after, because they have good visibility even in strong outside light or in a dark place, which cannot be provided by the electroluminescence (EL) or electronic paper.

Some semi-transmissive liquid crystal display device are structured as follows. A reflective display electrode (a reflective electrode) is formed in part on a transparent display electrode (a transparent electrode) of a transmissive liquid crystal display device. In this case, however, since the reflective optical path length is twice the transmissive optical path length, it is impossible to offer high display quality in both transmissive and reflective portions. To address this problem, Patent Publication 1 discloses a technique of improving display quality in both transmissive and reflective portions by optimizing the transmissive optical path length and the reflective optical path length by forming a depressed area at the center of a pixel region on an electrode substrate so as to form a transmissive portion and providing a reflective electrode around the transmissive portion. Hereinafter, such a structure is referred to as a TFT multi-gap structure.

FIG. 5 is a plan view schematically showing a pixel portion in a conventional TFT multi-gap structure, and FIG. 6 is a sectional view of FIG. 5, taken along line C-C.

As shown in FIG. 5, in a liquid crystal display element 100 having the TFT multi-gap structure, pixel portions are provided one for each region surrounded by adjacent gate conductors 101 and adjacent source conductors 102, so that a plurality of pixel portions are arranged in a matrix. Each pixel portion has a transmissive region 103 at the center thereof and a reflective region 104 around the transmissive region 103. To form a multi-gap, there is provided a tapered region 105 (shown in FIG. 6) near the boundary between the transmissive region 103 and the reflective region 104, where there is a height difference between resin layers. This tapered region 105 does not contribute to transmission or reflection, and is practically an ineffective display region.

On the other hand, to deal with the above-described problem that the reflective optical path length becomes twice the transmissive optical path length, a technique of forming a cell gap of transmissive/reflective portions on the opposing substrate side has been adopted in recent years. Hereinafter, such a structure is referred to as an opposing layer multi-gap structure.

FIG. 7 is a plan view schematically showing a pixel portion in a conventional opposing layer multi-gap structure, and FIG. 8 is a sectional view of FIG. 7, taken along line D-D.

As shown in FIG. 7, in a liquid crystal display element 200 having the opposing layer multi-gap structure, pixel portions are provided one for each region surrounded by adjacent gate conductors 201 and adjacent source conductors 202, so that a plurality of pixel portions are arranged in a matrix. In each pixel portion, a transmissive region 203 and a reflective region 204 are arranged, as seen in a plan view, one in an upper part and the other in a lower part of the pixel.

With this opposing layer multi-gap structure, there is no need to form a height difference in the part where the transmissive regions 203 of the adjacent pixel portions are adjacent to each other, and there is a need to form a height difference in the part where the transmissive region 203 and the reflective region 204 are adjacent to each other. When such a height difference is formed between the adjacent pixel portions, it is possible to form a tapered region 205 (shown in FIG. 8) producing the height difference over an ineffective display region in a conductor portion lying between the pixel portions on the TFT substrate.

Thus, this opposing layer multi-gap structure makes it possible to extend a usable effective display region near the conductor portion. In addition, only one of the four sides of the transmissive portion, which is rectangular as seen in a plan view, serves as a tapered region (an ineffective display region), where there is a height difference between resin layers. This helps reduce structural waste, and makes it possible to increase the total aperture ratio, that is, the sum of aperture ratios in the transmissive and reflective regions.

Patent Publication 1: JP-A-H11-316382

DISCLOSURE OF THE INVENTION

Problems to be Solved by the Invention

In the conventional TFT multi-gap structure mentioned earlier, a depressed area is formed in an insulating film. As a result, current leakage easily occurs between a transparent electrode of the transmissive portion and surrounding conductors lying on the lower layer. To avoid this, a depressed area formed by etching, for example, needs to be located at more than a certain distance from the surrounding conductors. As a result, at a height difference between the rectangular transmissive portion formed at the center and the reflective portion formed around the transmissive portion, a tapered region of resin exists around the all four sides of the transmissive portion, serving as an ineffective display region that does not contribute to a transmissive or reflective display. This increases structural waste, and undesirably reduces the aperture ratio.

On the other hand, in the conventional opposing layer multi-gap structure described above, in the region 205 where the source conductor 202 and the transmissive region 203 overlap one above the other, the transmissive regions 203 of the adjacent pixel portions are adjacent to each other without interposing the reflective region 204 therebetween. In this region, a liquid crystal cell gap is thicker than that of the reflective region 204, and an electric field existing between the substrates is weaker than that of the reflective region 204. As a result, since the ratio of the electric field existing between the adjacent pixel electrodes (horizontal electric field) to the electric field existing between the substrates becomes larger than that of the conventional structure, this region has display characteristics different from those of the normal region. In particular, characteristics are reduced greatly in a normally white mode in which black is displayed when a voltage is applied, and in dot inversion driving in which a potential difference between the adjacent pixel portions is large.

An example of such characteristics reduction is a reverse tilt domain, undesirably leading to poor contrast or afterimage. Even when light is shielded from the problem region by an electrode conductor, reflective display characteristics are affected by the light reflection on the conductor. Thus, it is characteristically preferable that light be shielded by using a black matrix formed on the opposing substrate side. However, shielding of light by using the black matrix necessitates to use a black matrix having a width of up to about 30 micrometer (μm). The problem here is that a black matrix having such a width leads to a substantial reduction in the aperture ratio.

In view of the conventionally experienced problems described above, an object of the present invention is to provide a semi-transmissive liquid crystal display device capable of a transmissive display that does not suffer from domain afterimage or the like and offers high display quality and a reflective display that is bright due to high reflectance. This liquid crystal display device has a liquid crystal display panel that does not suffer from poor contrast or afterimage in both transmissive/reflective displays, and that can achieve a brighter display due to a high reflective aperture ratio.

Means for Solving the Problem

To achieve the above object, according to one aspect of the present invention, a liquid crystal display device is provided with a liquid crystal display panel. In this liquid crystal panel, a liquid crystal is supported by being sandwiched between a pair of electrode substrates, each having a plurality of pixel regions formed two-dimensionally thereon, each pixel region has at least one transmissive display region and at least one reflective display region, the transmissive display region is, in at least one side thereof, adjacent to a transmissive display region of an adjacent pixel region without interposing the reflective display region therebetween, the reflective display region is, in at least one side thereof, adjacent to a reflective display region of an adjacent pixel region without interposing the transmissive display region therebetween, an inter-pixel region lying between the adjacent transmissive display regions and an inter-pixel region lying between the adjacent reflective display regions lie in the same straight line, and a black matrix is formed above the linear inter-pixel regions lying between the adjacent transmissive display regions and between the adjacent reflective display regions. In this liquid crystal display device, the black matrix is formed to have a multiple width in such a way that the black matrix has a larger width above the inter-pixel region lying between the adjacent transmissive display regions and has a smaller width above the inter-pixel region lying between the adjacent reflective display regions.

To achieve the above object, according to another aspect of the present invention, a liquid crystal display device is provided with a liquid crystal display panel. In this liquid crystal panel, a liquid crystal is supported by being sandwiched between a pair of electrode substrates, each having a plurality of pixel regions formed two-dimensionally thereon, each pixel region has at least one transmissive display region and at least one reflective display region, the transmissive display region is, in at least one side thereof, adjacent to a transmissive display region of an adjacent pixel region without interposing the reflective display region therebetween, the reflective display region is, in at least one side thereof, adjacent to a reflective display region of an adjacent pixel region without interposing the transmissive display region therebetween, an inter-pixel region lying between the adjacent transmissive display regions and an inter-pixel region lying between the adjacent reflective display regions lie in the same straight line, and a black matrix is formed above the linear inter-pixel regions lying between the adjacent transmissive display regions and between the adjacent reflective display regions. In this liquid crystal display device, the black matrix is formed only above the inter-pixel region lying between the adjacent transmissive display regions and is not formed above the inter-pixel region lying between the adjacent reflective display regions.

In the liquid crystal display device of the present invention, the pixel region, the transmissive display region, and the reflective display region are all rectangular as seen in a plan view, and the pixel region is divided into a plurality of regions, so that the transmissive display region and the reflective display region are arranged in the plurality of divided regions.

In the liquid crystal display device of the present invention, the pixel region is divided into two regions in the up/down or left/right direction, so that the transmissive display region and the reflective display region are arranged in the two divided regions.

In the liquid crystal display device of the present invention, the pixel region is divided into three regions in the up/down or left/right direction, so that the transmissive display region and the reflective display region are alternately arranged in the three divided regions.

In the liquid crystal display device of the present invention, the pixel region is divided into four regions in the up/down and left/right directions, so that the transmissive display region and the reflective display region are alternately arranged in the four divided regions.

In the liquid crystal display device of the present invention, a conductor portion (an ineffective display region) formed between adjacent pixel regions in one electrode substrate of the pair of electrode substrates and at least one tapered region (an ineffective display region) producing a height difference between the transmissive and reflective display regions, the tapered region being formed in another electrode substrate, which faces the one electrode substrate, are arranged to overlap one another, as seen in a plan view.

In the liquid crystal display device of the present invention, the plurality of pixel regions are arranged in a matrix, the pixel regions are provided one for each region surrounded by a scanning conductor and a signal conductor, and each pixel region includes a transparent electrode formed in the transmissive display region, a reflective electrode formed in the reflective display region, and a transistor element that is formed near the intersection of the scanning conductor and the signal conductor and drives the transparent electrode and the reflective electrode according to a signal voltage fed from the signal conductor based on a scanning signal fed from the scanning conductor.

In the liquid crystal display device of the present invention, the transistor element is covered with the reflective electrode.

In the liquid crystal display device of the present invention, the black matrix is formed above the scanning conductor or/and the signal conductor so as to overlap the scanning conductor or/and the signal conductor.

In the liquid crystal display device of the present invention, the width of the black matrix formed above the inter-pixel region lying between the adjacent transmissive display regions is in the range from 10 μm to 30 μm, both ends inclusive.

In the liquid crystal display device of the present invention, the width of the black matrix formed above the inter-pixel region lying between the adjacent reflective display regions is in the range from 3 μm to 10 μm, both ends inclusive.

In the liquid crystal display device of the present invention, the width of the black matrix formed above the inter-pixel region lying between the adjacent reflective display regions is smaller than the width of the black matrix formed above the inter-pixel region lying between the adjacent transmissive display regions by, at each side, a predetermined dimension in the range from 1 μm to 15 μm, both ends inclusive.

In the liquid crystal display device of the present invention, the width of the black matrix formed above the inter-pixel region lying between the adjacent transmissive display regions is 18 μm, and the width of the black matrix formed above the inter-pixel region lying between the adjacent reflective display regions is 6 μm.

With the structure described above, the present invention has the following advantages.

The alignment of the liquid crystal molecules near the boundary between the adjacent pixel portions is disturbed by a horizontal electric field generated by a potential difference between the adjacent pixel portions or a leakage electric field from the conductor arranged below the electrode, resulting in poor display quality. In the opposing layer multi-gap structure, when transmissive portions of the adjacent pixel portions are adjacent to each other without interposing a reflective portion therebetween, the alignment disturbance in the transmissive region becomes greater than that in the reflective portion due to a weak electric field between the electrode substrates. That is, the reflective portion suffers little from a reverse tilt domain caused by a horizontal electric field, and yet, in the conventional structure, a black matrix having the same width as that of the transmissive portion is arranged in the reflective portion, unnecessarily leading to a low aperture ratio.

On the other hand, according to the present invention, in the multi-gap semi-transmissive liquid crystal display device in which adjacent transmissive portions are adjacent to each other with a black matrix laid therebetween and adjacent reflective portions are adjacent to each other with a black matrix laid therebetween, the black matrix is formed to have a larger width along the transmissive portion and have a smaller width along the reflective portion.

As described above, according to the present invention, a black matrix BM having a larger width is arranged in the transmissive portion to cover wide alignment disturbance, and a black matrix BM having a smaller width is arranged in the reflective portion to cover narrow alignment disturbance. This makes it possible to achieve a maximum aperture ratio and a proper display quality with a minimum light shielding region.

There may be cases where, depending on liquid crystal cell mode, driving state, and positional relation between the electrodes, alignment disturbance occurs between the adjacent transmissive portions, but does not occur between the adjacent reflective portions. In such a case, it is possible to adopt a structure in which a black matrix BM is arranged only above a straight line between the adjacent transmissive portions and is not arranged above a straight line between the adjacent reflective portions. This makes it possible to achieve a maximum aperture ratio and a proper display quality with a minimum light shielding region.

As described above, the transmissive portion can offer a display with high contrast that does not suffer from afterimage or the like by shielding light from the domain lying between the adjacent pixels, and the reflective portion can offer a brighter display by increasing the aperture ratio thereof by making the black matrix width as small as possible or forming no black matrix.

Advantages of the Invention

According to the present invention, a black matrix formed above a single straight line is made to have a larger width in the region where transmissive portions are adjacent to each other, and is made to have a smaller width or not formed at all in the region where reflective portions are adjacent to each other. This makes it possible to obtain a higher aperture ratio by shielding right from the region between the transmissive portions where alignment disturbance occurs due to a horizontal electric field and by shielding no more light than is necessary from the reflective portion.

Figure 1:
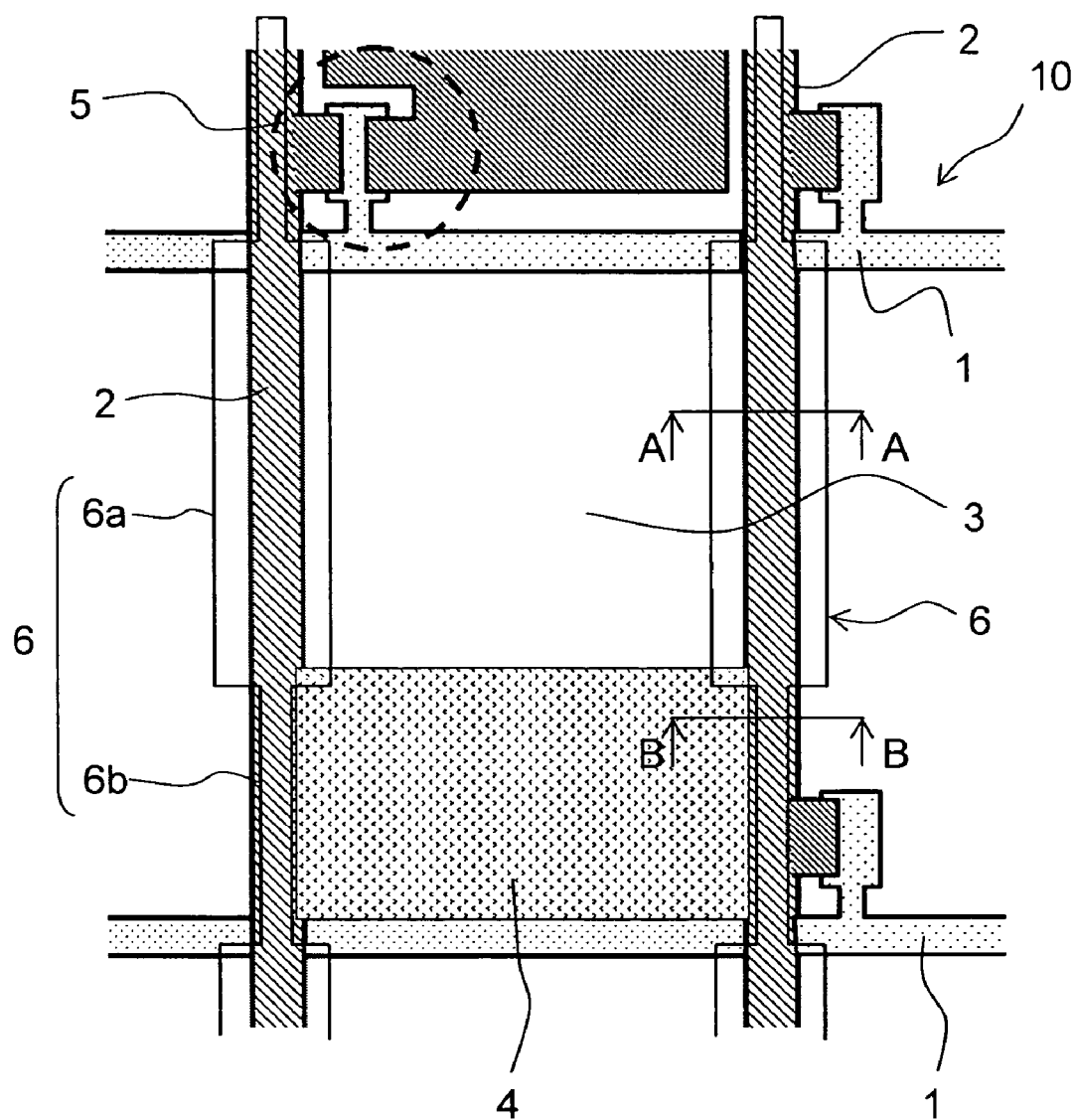
FIG. 1 A plan view showing an example of the structure of a principal portion of the liquid crystal display element of a first embodiment of the present invention.

LIST OF REFERENCE SYMBOLS 1, 11 gate conductor
2, 12 source conductor
3, 13 ITO transparent electrode
4, 14 Al reflective electrode
5, 15 TFT element
6, 16 black matrix
6a larger-width portion
6b smaller-width portion
10, 20 liquid crystal display element
103, 203 transmissive region
104, 204 reflective region
105, 205 tapered region
501 gate conductor
502 interlayer insulating film
503 drain electrode
504 source conductor
505 insulating film
506 transparent electrode 507 reflective electrode
508 liquid crystal
509 opposing substrate

BEST MODE FOR CARRYING OUT THE INVENTION

Hereinafter, the liquid crystal display elements (liquid crystal display panels) of the liquid crystal display devices of first and second embodiments of the present invention will be described with reference to the drawings.

First Embodiment

Figure 2:
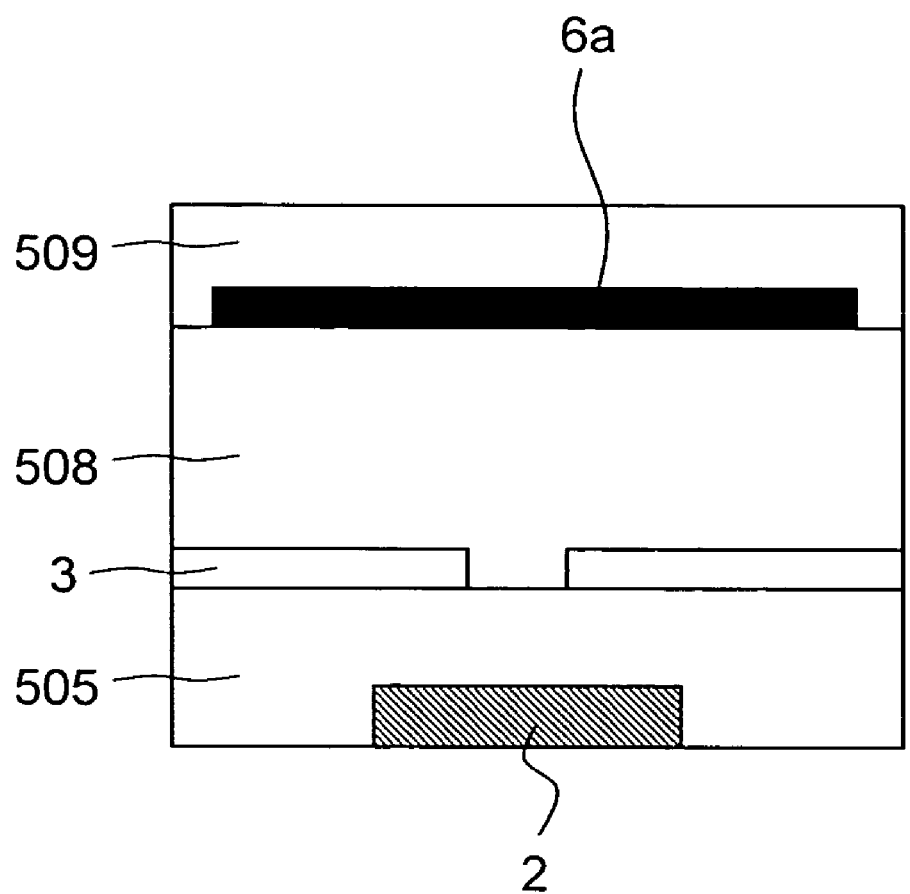
FIG. 2 A sectional view taken along line A-A shown in FIG. 1.
Figure 3:
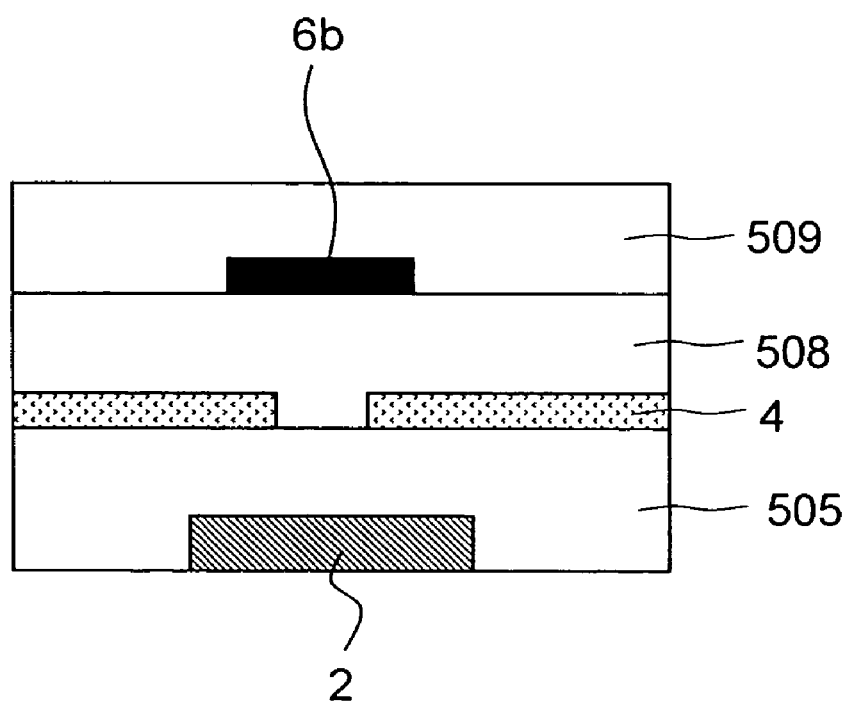
FIG. 3 A sectional view taken along line B-B shown in FIG. 1.

FIG. 1 is a plan view showing an example of a principal portion of the liquid crystal display element of the first embodiment of the present invention. FIG. 2 is a sectional view taken along line A-A shown in FIG. 1. FIG. 3 is a sectional view taken along line B-B shown in FIG. 1.

As shown in FIG. 1, in a liquid crystal display element 10 having the opposing layer multi-gap structure, a plurality of pixel regions (pixel portions) are arranged two-dimensionally in a matrix on the side of a TFT substrate, which is one of the electrode substrates. The pixel portions are provided one for each region surrounded by a gate conductor 1 serving as a scanning conductor made of tungsten and tantalum and a source conductor 2 serving as a signal conductor made of titanium and aluminium. The pixel portions are each rectangular as seen in a plan view, and are each provided with an ITO transparent electrode 3 forming a transparent display region, which is rectangular as seen in a plan view, in an upper layer relative to the source conductor 2 with an insulating layer laid in between, an Al reflective electrode 4 forming a reflective display region, which is rectangular in a plan view, above the ITO transparent electrode 3, and a TFT element 5 that is formed near the intersection of the gate conductor 1 and the source conductor 2 and serves as a transistor element for driving the ITO transparent electrode 3 and the Al reflective electrode 4 of the pixel portion. The ITO transparent electrode 3 and the Al reflective electrode 4 are arranged along the plane of each pixel region (pixel portion), one in an upper part and the other in a lower part of the pixel.

The pixel pitch of this pixel portion is 50 μm wide by 150 μm long, for example. A clearance of 3 μm is formed between the adjacent pixel portions for preventing current leakage. The ITO transparent electrode 3 measures 47 μm wide by 147 μm long. Both the gate conductor 1 and the source conductor 2 have a width of 9 μm. The side of the ITO transparent electrode 3 and the gate conductor 1 overlap one another by 3 μm, and the side of the ITO transparent electrode 3 and the source conductor 2 overlap one another by 3 μm. The reflective region (the Al reflective electrode 4) of each pixel portion is arranged in a lower part of the pixel portion, and occupies about one third of the total area of the pixel portion. The Al reflective electrode 4 measures 45 μm wide by 46 μm long. The Al reflective electrode 4 is formed in an upper layer relative to the TFT element 5, whereby, when seen from the substrate surface side (the display screen side), the TFT element 5 is hidden under (behind) the Al reflective electrode 4 as seen in a so-called plan view. To deal with overetching, the Al reflective electrode 4 is formed 1 μm inward of the ITO transparent electrode 3 in the left/right direction as seen in a plan view.

The electrode surfaces of the electrode substrates, of which one is a TFT substrate and the other is an opposing substrate, are applied with an alignment film, and then the alignment film undergoes rubbing treatment. Then, these substrates are pasted together in such a way that the electrode on the TFT substrate and the electrode on the opposing substrate face each other. The rubbing treatment is performed on the TFT substrate in the downward direction of FIG. 1, for example, and is performed on the opposing substrate in the upward direction of FIG. 1, for example. In this multi-gap structure, the transmissive portion (the ITO transparent electrode 3) has a cell gap of 4.6 μm, and the reflective portion (the Al reflective electrode 4) has a cell gap of 2.3 μm. The cell gap (height difference) of the transmissive and reflective portions may be provided on the TFT substrate or the opposing substrate; in the first embodiment, a height difference is provided on the opposing substrate side. Between the adjacent pixel portions, an ineffective display region in a conductor portion lying between the pixel portions on the TFT substrate and an ineffective display region in a tapered region producing a height difference on the opposing substrate are arranged to overlap one another, as seen in a plan view.

A color filter (not shown) and a light shielding black matrix 6 are formed in the opposing substrate 509 (shown in FIG. 2). In the first embodiment, the cell gap inside the display surface is retained with a photo-spacer located on the opposing substrate side, and the cell gap at the outer circumference of the display portion is retained with a glass spacer mixed in a thermoset epoxy sealing material. This sealing material is provided at the outer circumference of the panel except for a liquid crystal inlet. A liquid crystal material is sealed in as follows. The liquid crystal material is vacuum injected through the liquid crystal inlet, and then the inlet is sealed with an ultraviolet (UV) curing acrylic sealing material. Used as the liquid crystal material is a nematic liquid crystal material ($\Delta n$=0.0712, $\Delta \epsilon$=7.3).

As one pixel portion, an ITO transparent electrode 3 and an Al reflective electrode 4 are arranged in an upper region and a lower region thereof, respectively, as seen in a plan view, and, as another pixel portion adjacent to the one pixel portion, an ITO transparent electrode 3 and an Al reflective electrode 4 are arranged in an upper region and a lower region thereof, respectively, as seen in a plan view. An inter-pixel region lying between these two adjacent pixel portions lies in the same straight line (the source conductor 2). As seen from the display screen side in a plan view, the black matrix 6 is disposed at the front of the source conductor 2 so as to cover the source conductor 2. The black matrix 6 is formed to have a multiple width (a larger-width portion 6a and a smaller-width portion 6b) in such a way that it has a larger width (a larger-width portion 6a) in the transmissive portion (the linear region (inter-pixel region) lying between the adjacent ITO transparent electrodes 3) and has a smaller width (a smaller-width portion 6b) in the reflective portion (the linear region lying between the adjacent Al reflective electrodes 4).

In this case, it is preferable that the width of the black matrix 6 along the transmissive portion be in the range from 10 μm to 30 μm, both ends inclusive (or the upper end exclusive), for the following reasons As described earlier, the conductor width is 9 μm. When the width of the black matrix 6 is less than 10 μm, the characteristics advantage is lost compared to the case where the black matrix 6 is formed straight as in a conventional example. In addition, although alignment disturbance in the transmissive region occurs within different widths depending on conditions such as cell gap, inter-pixel distance, driving state, and material characteristics, it is observed within a width of up to 20 μm. Therefore, given that the two substrates are pasted together with a horizontal displacement of 5 μm, a black matrix having a width of up to 30 μm ensures a satisfactory display regardless of the above-mentioned conditions. It is further preferable that the width of the black matrix 6 along the transmissive portion be equal to or greater than 10 µm but equal to or smaller than (or simply smaller than) 20 µm.

On the other hand, it is preferable that the width of the black matrix 6 along the reflective portion be in the range from 3 µm to 10 µm, both ends inclusive (or the upper end exclusive), for the following reasons. The black matrix formed in the reflective portion is provided for shielding light from a reverse tilt domain and preventing color mixture. Since the manufacturing process produces a displacement of about 3 µm, it is necessary to form a black matrix having a width of at least 3 µm to completely prevent color mixture in the portion where color resists are adjacent to each other. In addition, alignment disturbance in the reflective region occurs within different widths depending on conditions such as cell gap, inter-pixel distance, driving state, and material characteristics. However, it is possible to obtain sufficiently satisfactory reflective characteristics by shielding light from an area having a width of up to 10 µm even allowing for a displacement of the substrates pasted together. It is further preferable that the width of the black matrix 6 along the reflective portion be equal to or greater than 6 µm but equal to or smaller than 10 µm.

It is preferable that the width of the black matrix 6 along the reflective portion be smaller than the width of the black matrix 6 along the transmissive portion by, at each side, a predetermined dimension in the range from 1 µm to 15 µm, both ends inclusive (or the upper end exclusive). When the predetermined dimension is less than 1 µm, there is a possibility that the black matrix 6 ends up having a linear shape when final touches are added thereto at the end of the manufacturing process. Also in this case, the features of the present invention cannot be fully exploited. In addition, although the difference in alignment disturbance occurrence width between the transmissive region and the reflective region varies depending on conditions such as cell gap, inter-pixel distance, driving state, and material characteristics, it is equal to or smaller than (or simply smaller than) 15 µm at the maximum. Assuming that the difference is made greater, it does not help improve the quality of a transmissive display and only reduces a transmissive aperture ratio.

Specifically, when the liquid crystal display device 10 of the first embodiment is driven using a dot inversion method with a white voltage of 1.2 V and a black voltage of 3.7 V, a domain afterimage appears in the transmissive region along the source conductor 2 in an area having a width of 8 µm. To deal with this problem, when, on the assumption that a fit displacement margin resulting from the manufacturing process is 5 µm at each side, the black matrix 6 is formed to have a width of 18 µm along the transmissive portion (the linear region lying between the adjacent ITO transparent electrodes 3) and have a width of 6 µm along the reflective portion (the linear region lying between the adjacent Al reflective electrodes 4) so that, as seen in a plan view, the center of the black matrix 6 matches the center of the source conductor 2, no domain afterimage is observed in both transmissive/reflective displays. In addition, when the black matrix having a uniform width of 18 µm is disposed as in a conventional example, the area of the reflective region is 1472 square micrometers (=46 µm multiplied by 32 µm); in this embodiment, 2024 square micrometers (=46 µm multiplied by 44 µm). In this way, it is possible to increase the area of the reflective region by about 40% compared to the conventional example.

Second Embodiment

Figure 4:
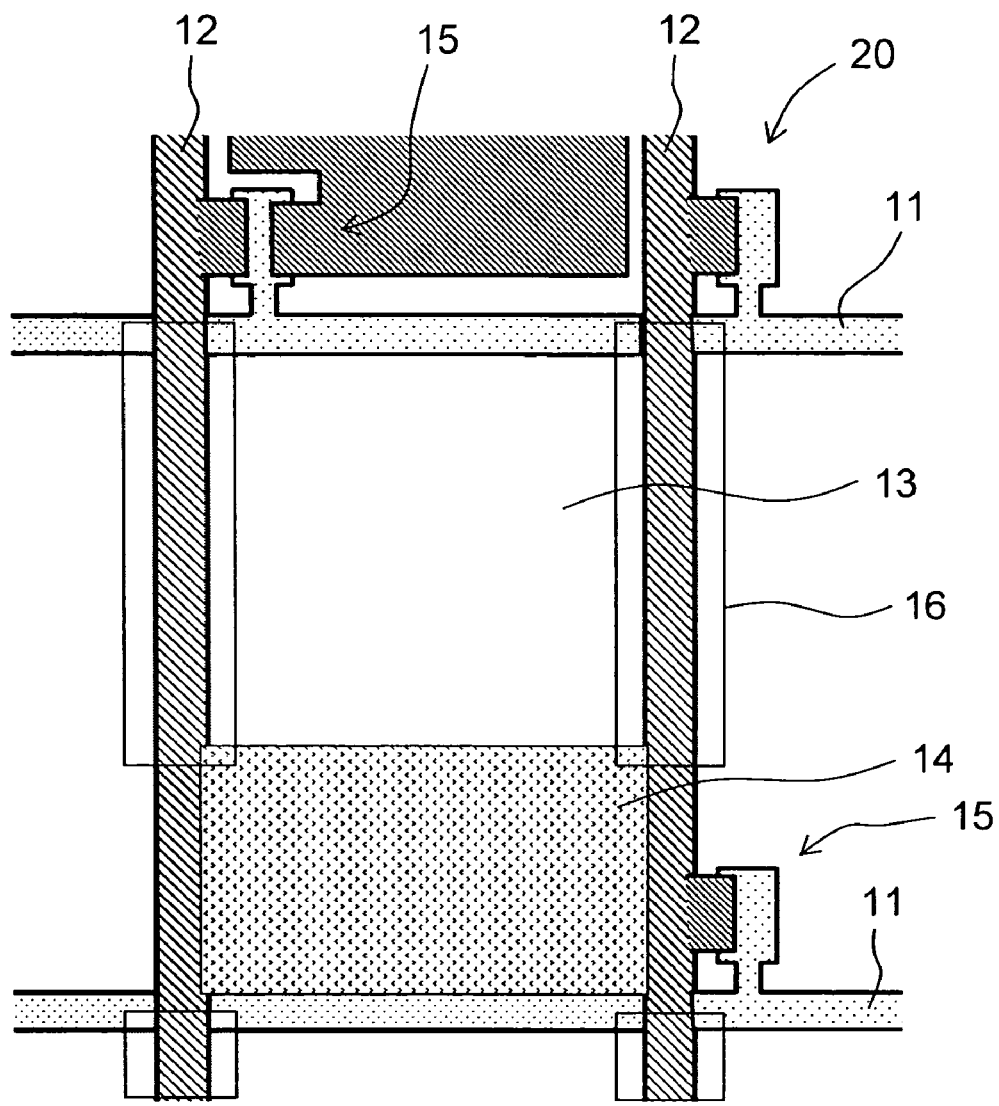
FIG. 4 A plan view showing an example of the structure of a principal portion of the liquid crystal display element of a second embodiment of the present invention.
Figure 5:
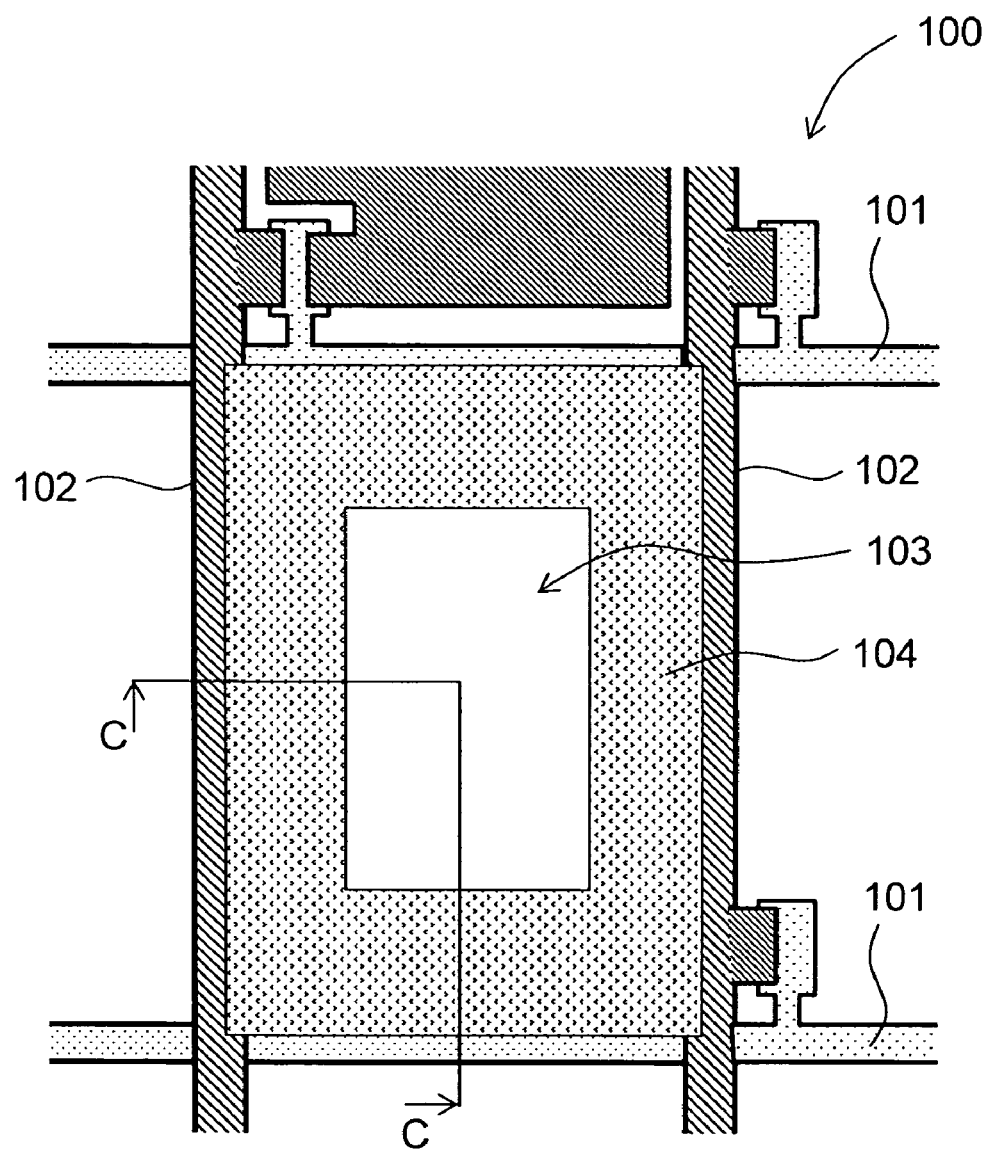
FIG. 5 A plan view schematically showing a pixel portion in a conventional TFT multi-gap structure.
Figure 6:
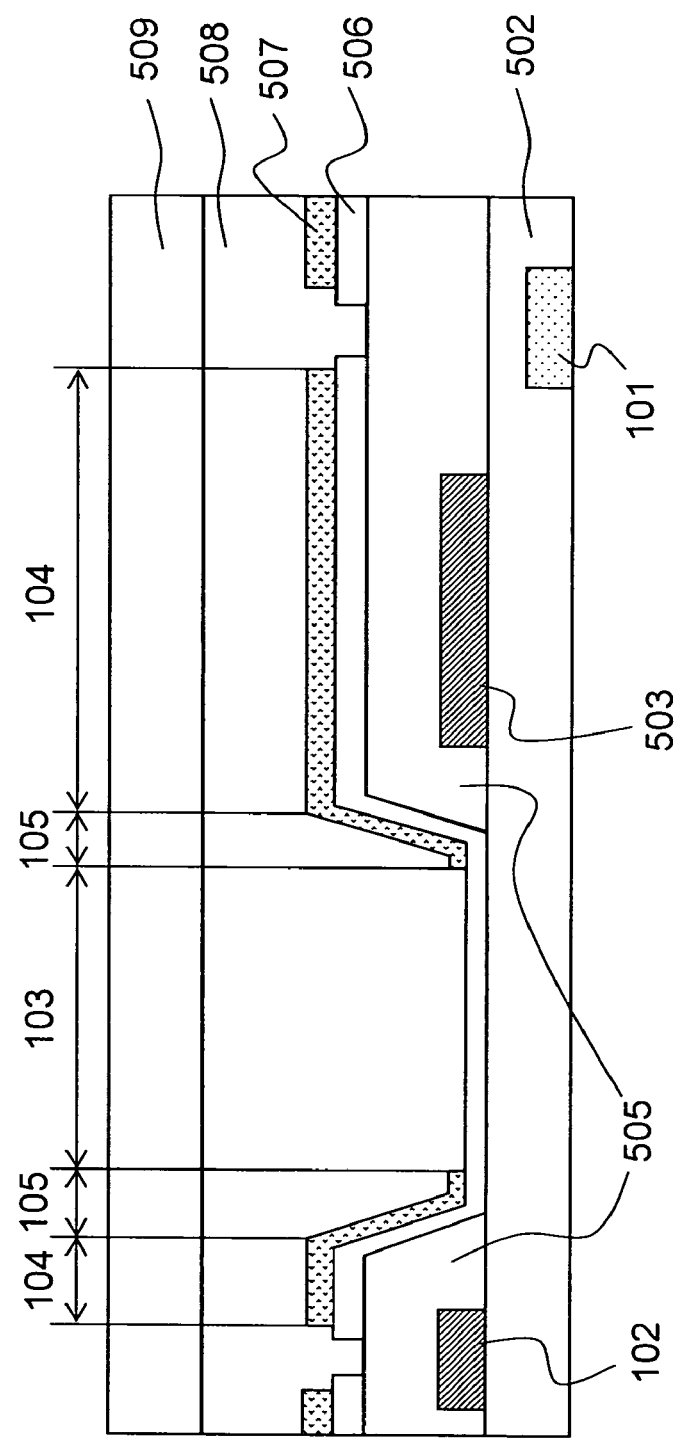
FIG. 6 A sectional view taken along line C-C shown in FIG. 5.
Figure 7:
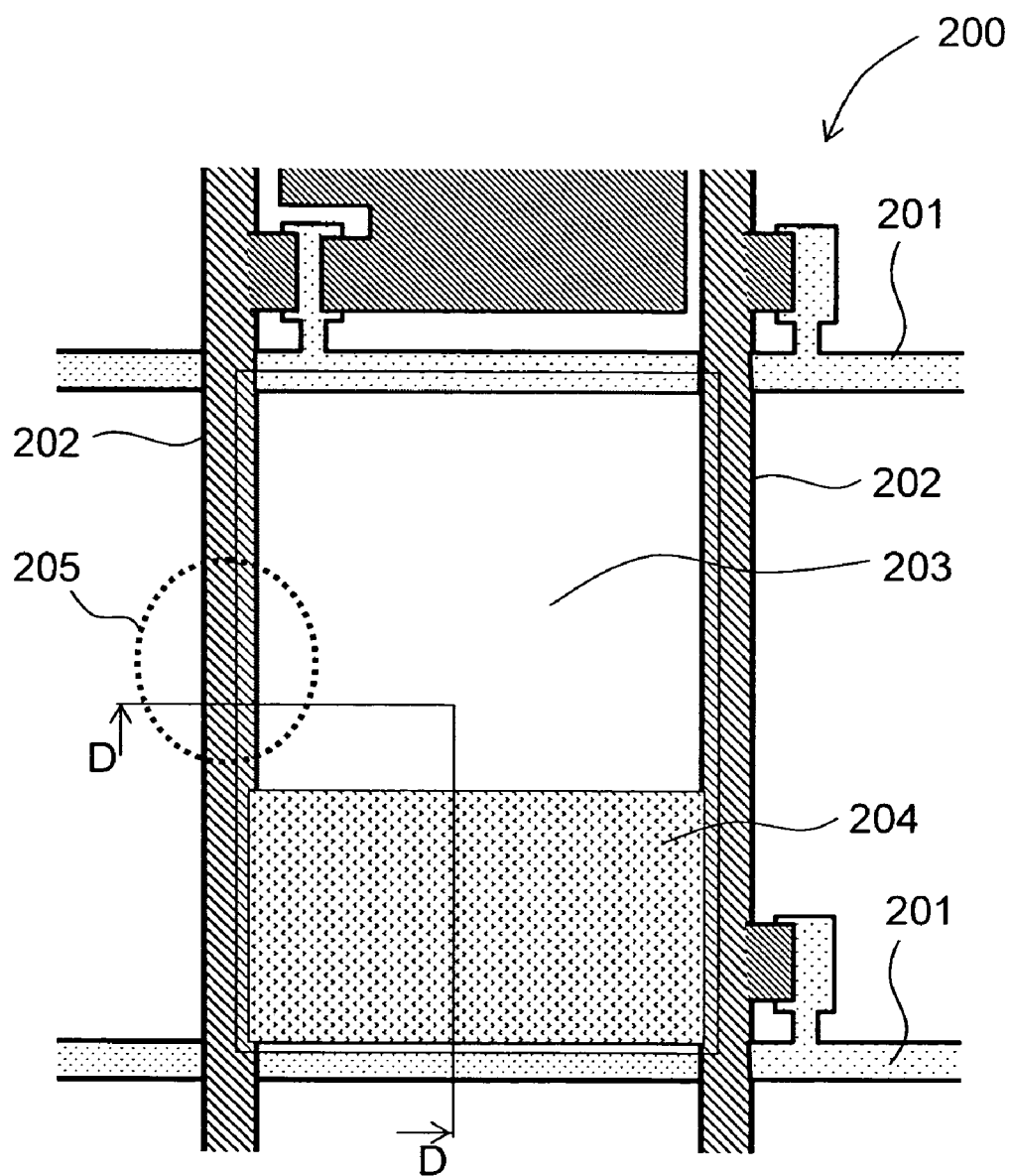
FIG. 7 A plan view schematically showing a pixel portion in a conventional opposing layer multi-gap structure.
Figure 8:
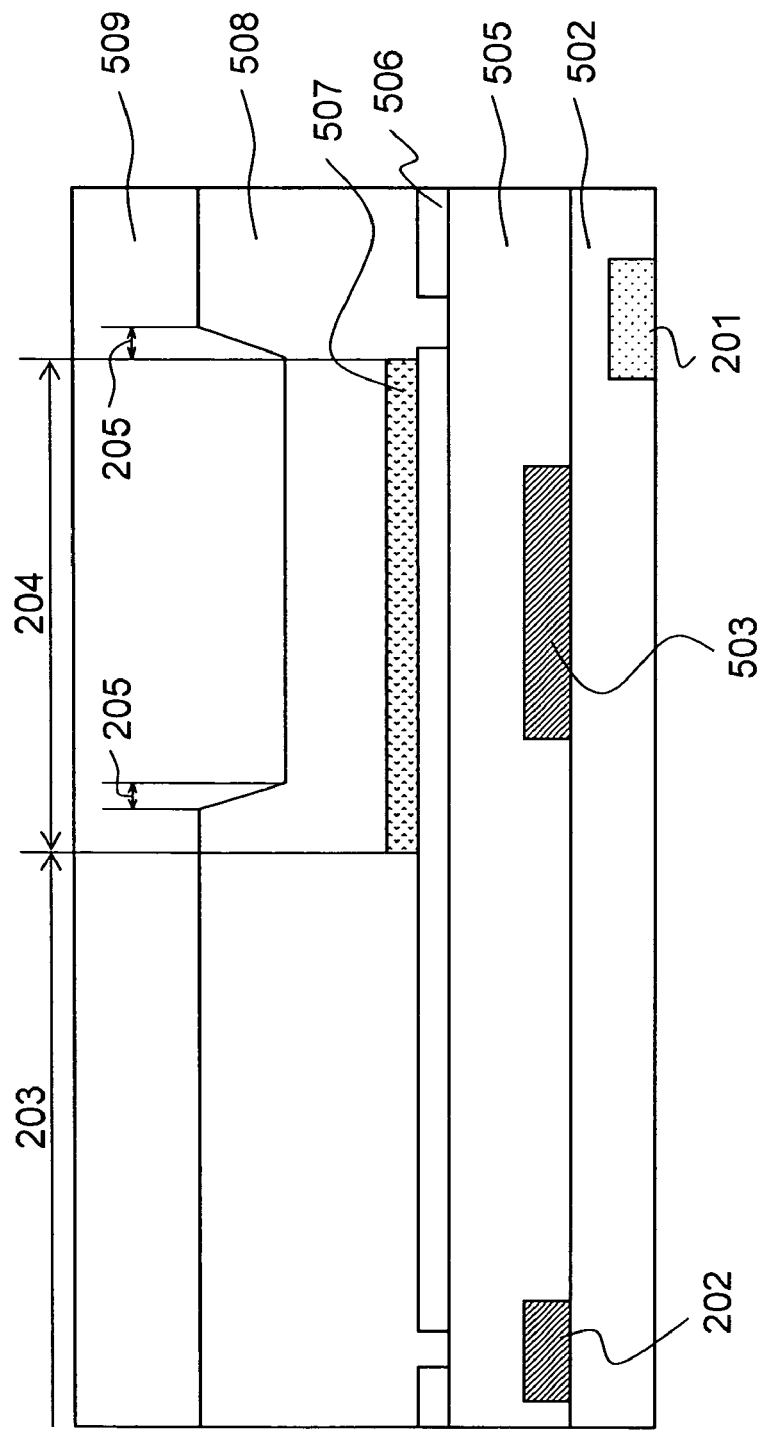
FIG. 8 A sectional view taken along line D-D shown in FIG. 7.

The first embodiment described above deals with a case where, between the adjacent transmissive portions (the ITO transparent electrodes 3), the width of a black matrix 6 is made large enough to cover wide alignment disturbance, and, between the adjacent reflective portions (the Al reflective electrodes 4), the width thereof is made small enough to cover narrow alignment disturbance. In a second embodiment, there may be cases where, depending on conditions such as liquid crystal cell mode, driving state, and positional relation between the electrodes, alignment disturbance of the liquid crystal occurs between the adjacent transmissive portions (the ITO transparent electrodes), but does not occur between the adjacent reflective portions (the Al reflective electrodes). In such a case, it is possible to adopt a structure in which a black matrix is provided only between the adjacent transmissive portions (the ITO transparent electrodes) and is not provided between the adjacent reflective portions (the Al reflective electrodes). FIG. 4 is a plan view showing an example of the structure of a principal portion of the liquid crystal display element of the second embodiment of the present invention.

In FIG. 4, in a liquid crystal display element 20 having the opposing layer multi-gap structure, a plurality of pixel portions are arranged in a matrix on the side of a TFT substrate, which is one of a pair of electrode substrates. The pixel portions are provided one for each region surrounded by a gate conductor 11 made of tungsten and tantalum and a source conductor 12 made of titanium and aluminium. The pixel portions are each provided with an ITO transparent electrode 13 forming a transparent display region occupying an upper rectangular part of the pixel in an upper layer relative to the source conductor 12 with an insulating layer laid in between, an Al reflective electrode 14 forming a reflective display region occupying a lower rectangular part of the pixel above the ITO transparent electrode 13, and a TFT element 15 that is formed near the intersection of the gate conductor 11 and the source conductor 12 and serves as a transistor element for driving the ITO transparent electrode 13 and the Al reflective electrode 14 of the pixel portion.

The electrode surfaces of the electrode substrates, of which one is a TFT substrate and the other is an opposing substrate opposing the TFT substrate, are applied with an alignment film, and then alignment film undergoes rubbing treatment. Then, these substrates are pasted together in such a way that the electrode on the TFT substrate and the electrode on the opposing substrate face each other. The rubbing treatment is performed on the TFT substrate in the downward direction of FIG. 4, and is performed on the opposing substrate in the upward direction of FIG. 4. In this multi-gap structure, the transmissive portion has a cell gap of 4.6 µm, and the reflective portion has a cell gap of 2.3 µm. The cell gap of the transmissive portion and the reflective portion may be provided on the TFT substrate or the opposing substrate; in the second embodiment, a height difference is provided on the opposing substrate side.

A color filter and a light shielding black matrix 16 are formed in the opposing substrate. In the second embodiment, the cell gap inside the display surface is retained with a photo-spacer located on the opposing substrate side, and the cell gap at the outer circumference of the display portion is retained with a glass spacer mixed in a thermoset epoxy sealing material. The sealing material is provided at the outer circumference of the panel except for a liquid crystal inlet. A liquid crystal is sealed between the substrates as follows. A liquid crystal material is vacuum injected through the liquid crystal inlet, and then the inlet is sealed with an ultraviolet (UV) curing acrylic sealing material. Used as the liquid crystal material is a nematic liquid crystal material ($\Delta n=0.0712$, $\Delta \epsilon = 7.3$).

In the second embodiment, the black matrix 16 is not formed in the reflective portion (the region including a region lying between the adjacent Al reflective electrodes 14), but is formed only in the transmissive portion (the region including a region lying between the adjacent ITO transparent electrodes 13). Although there is a possibility that color mixture occurs due to displacement of the substrates pasted together, there is no loss of reflective aperture ratio caused by the black matrix. Thus, this structure is suitable for applications that place greater importance on brightness than on color purity.

As described above, the first and second embodiments deal with a multi-gap semi-transmissive liquid crystal display device capable of a transmissive display that does not suffer from domain afterimage or the like and offers high display quality and a reflective display that is bright due to high reflectance. In this liquid crystal display device, the black matrix 6 is formed to have a larger width in the linear region lying between the adjacent ITO transparent electrodes 3 (the linear region along the longer side direction of the source conductor 2 overlapping the transmissive portion) and have a smaller width in the linear region lying between the adjacent Al reflective electrodes 4 (the linear region along the longer side direction of the source conductor 2 overlapping the reflective portion), or the black matrix 16 is formed only in the linear region lying between the adjacent ITO transparent electrodes 13 (the linear region along the longer side direction of the source conductor 2 overlapping the transmissive portion) and is not formed in the linear region lying between the adjacent Al reflective electrodes 14 (the linear region along the longer side direction of the source conductor 2 overlapping the reflective portion). This enables the transmissive portion to offer a display with high contrast that does not suffer from afterimage or the like by shielding light from the domain lying between the adjacent pixels, and the reflective portion to offer a brighter display by increasing the aperture ratio thereof by making the black matrix width as small as possible or forming no black matrix.

The first and second embodiments deal with structures in which a pixel region is divided into two regions, one of which is an ITO transparent electrode forming a transmissive display region in an upper part of the pixel, and the other is an Al reflective electrode forming a reflective display region in a lower part of the pixel. However, the present invention is not limited to this specific structure, but may be so implemented that the pixel region is divided into two regions, one of which is an ITO transparent electrode forming a transmissive display region in a left part of the pixel, and the other is an Al reflective electrode forming a reflective display region in a right part of the pixel. In this case, the black matrix is provided in the left/right direction above a gate conductor serving as a scanning conductor so as to overlap the gate conductor, and is formed to have a multiple width in such a way that it has a larger width in the linear region lying between the adjacent transmissive display regions and has a smaller width in the linear region lying between the adjacent reflective display regions. Alternatively, the black matrix is formed only above the linear region lying between the adjacent transmissive display regions and is not formed above the linear region lying between the adjacent reflective display regions.

The pixel region may be divided into three regions with alternating transmissive and reflective display regions in the up/down direction or the left/right direction. In this case, the pixel region is divided into three regions in the up/down direction or the left/right direction with alternating transmissive and reflective display regions in that order, or with alternating reflective and transmissive display regions in that order.

Alternatively, the pixel region may be divided into four regions (divided crosswise into four regions) with alternating transmissive and reflective display regions in the up/down and left/right directions. In this case, for example, the pixel region is divided into four regions in such a way that, in an upper part of the pixel, the transmissive and reflective display regions are arranged from left to right in that order, and, in a lower part of the pixel, the reflective and transmissive display regions are arranged from left to right in that order. That is, the same display regions are laid diagonally.

All that is required is that a pixel region, which is rectangular as seen in a plan view, be divided into one or more transmissive display regions, which are rectangular as seen in a plan view, and one or more reflective display regions, which are rectangular as seen in a plan view. In this case, between the two adjacent pixel regions, a black matrix is formed to have a multiple width in such a way that it has a larger width above the linear region lying between the adjacent transmissive display regions and has a smaller width above the linear region lying between the adjacent reflective display regions. Alternatively, a black matrix is formed only above the linear region lying between the adjacent transmissive display regions and is not formed above the linear region lying between the adjacent reflective display regions.

Hereinbefore, the present invention has been described by way of preferred first and second embodiments. The present invention, however, should not be interpreted as limited to those embodiments. It should be understood that the scope of the present invention should be interpreted only in light of the scope of the appended claims. It should be understood that a person skilled in the art can practice the present invention within an equivalent scope in light of the description of the specifically described preferred embodiments thereof, on the basis of the description of the present invention and technical common sense. It should be understood that the contents of all publications, patent applications, patents, and other references mentioned herein are applicable to explain the present invention as equally as what is specifically described in the present specification itself.

INDUSTRIAL APPLICABILITY

According to the present invention, in a semi-transmissive active-matrix liquid crystal display device, in particular, in the field of a liquid crystal display device such as a cellular phone or a car navigation system that is provided with a medium or small sized high-definition monitor, a transmissive portion can offer a display with high contrast that does not suffer from afterimage or the like by shielding light from the domain lying between the adjacent pixels, and a reflective portion can offer a brighter display by increasing the aperture ratio thereof by making a black matrix width as small as possible or forming no black matrix.

The invention claimed is:

1. A liquid crystal display device comprising:
a liquid crystal display panel, wherein
a liquid crystal is supported by being sandwiched between a pair of electrode substrates, the liquid crystal panel comprising a plurality of pixel regions formed two-dimensionally thereon,
each pixel region has at least one transmissive display region and at least one reflective display region,
the transmissive display region is, in at least one side thereof, adjacent to a transmissive display region of an adjacent pixel region without interposing the reflective display region therebetween, the reflective display region is, in at least one side thereof, adjacent to a reflective display region of an adjacent pixel region without interposing the transmissive display region therebetween, an inter-pixel region lying between the adjacent transmissive display regions and an inter-pixel region lying between the adjacent reflective display regions lie in a same straight line, and a black matrix is formed above the inter-pixel regions lying between the adjacent transmissive display regions and lying between the adjacent reflective display regions, wherein the black matrix is formed to have multiple widths so that the black matrix has a larger width at, as viewed from above, the inter-pixel region lying between the adjacent transmissive display regions and has a smaller width at, as viewed from above, the inter-pixel region lying between the adjacent reflective display regions.

2. The liquid crystal display device of claim 1, wherein the pixel region, the transmissive display region, and the reflective display region are all rectangular as seen in a plan view, and the pixel region is divided into a plurality of regions, so that the transmissive display region and the reflective display region are arranged in the plurality of divided regions.

3. The liquid crystal display device of claim 2, wherein the pixel region is divided into two regions in an up/down or left/right direction, so that the transmissive display region and the reflective display region are arranged in the two divided regions.

4. The liquid crystal display device of claim 2, wherein the pixel region is divided into three regions in an up/down or left/right direction, so that the transmissive display region and the reflective display region are alternately arranged in the three divided regions.

5. The liquid crystal display device of claim 2, wherein the pixel region is divided into four regions in an up/down and left/right directions, so that the transmissive display region and the reflective display region are alternately arranged in the four divided regions.

6. The liquid crystal display device of claim 1, wherein a conductor portion formed between adjacent pixel regions in one electrode substrate of the pair of electrode substrates and at least one tapered region producing a height difference between the transmissive and reflective display regions, the tapered region being formed in another electrode substrate, which faces the one electrode substrate, are arranged to overlap one another, as seen in a plan view.

7. The liquid crystal display device of claim 1, wherein the plurality of pixel regions are arranged in a matrix, the pixel regions are provided one for each region surrounded by a scanning conductor and a signal conductor, and each pixel region includes
  a transparent electrode formed in the transmissive display region,
  a reflective electrode formed in the reflective display region, and
  a transistor element that is formed near an intersection of the scanning conductor and the signal conductor and drives the transparent electrode and the reflective electrode according to a signal voltage fed from the signal conductor based on a scanning signal fed from the scanning conductor.

8. The liquid crystal display device of claim 7, wherein the transistor element is covered with the reflective electrode.

9. The liquid crystal display device of claim 7, the black matrix is formed above the scanning conductor or/and the signal conductor so as to overlap the scanning conductor or/and the signal conductor.

10. The liquid crystal display device of claim 1, wherein a width of the black matrix formed above the inter-pixel region lying between the adjacent transmissive display regions is in a range from 10 μm to 30 μm, both ends inclusive.

11. The liquid crystal display device of claim 1, wherein a width of the black matrix formed above the inter-pixel region lying between the adjacent reflective display regions is in a range from 3 μm to 10 μm, both ends inclusive.

12. The liquid crystal display device of claim 10, wherein a width of the black matrix formed above the inter-pixel region lying between the adjacent reflective display regions is smaller than a width of the black matrix formed above the inter-pixel region lying between the adjacent transmissive display regions by, at each side, a predetermined dimension in a range from 1 μm to 15 μm, both ends inclusive.

13. The liquid crystal display device of claim 10, wherein a width of the black matrix formed above the inter-pixel region lying between the adjacent transmissive display regions is 18 μm, and a width of the black matrix formed above the inter-pixel region lying between the adjacent reflective display regions is 6 μm.

14. A liquid crystal display device comprising:
a liquid crystal display panel wherein
  a liquid crystal is sandwiched between a pair of electrode substrates, the liquid crystal display panel comprising a plurality of pixel regions formed two-dimensionally,
  each pixel region has at least one transmissive display region and at least one reflective display region,
  the transmissive display region is, in at least one side thereof, adjacent to a transmissive display region of an adjacent pixel region without interposing the reflective display region therebetween,
  the reflective display region is, in at least one side thereof, adjacent to a reflective display region of an adjacent pixel region without interposing the transmissive display region therebetween,
  an inter-pixel region lying between the adjacent transmissive display regions and an inter-pixel region lying between the adjacent reflective display regions lie in a same straight line, and
  a black matrix is formed above the inter-pixel regions lying between the adjacent transmissive display regions and lying between the adjacent reflective display regions, wherein
the black matrix is formed only above the inter-pixel region lying between the adjacent transmissive display regions and is not formed above the inter-pixel region lying between the adjacent reflective display regions.

15. The liquid crystal display device of claim 14, wherein the pixel region, the transmissive display region, and the reflective display region are all rectangular as seen in a plan view, and the pixel region is divided into a plurality of regions, so that the transmissive display region and the reflective display region are arranged in the plurality of divided regions.

16. The liquid crystal display device of claim 15, wherein the pixel region is divided into two regions in an up/down or left/right direction, so that the transmissive display region and the reflective display region are arranged in the two divided regions.

17. The liquid crystal display device of claim 15, wherein the pixel region is divided into three regions in an up/down or left/right direction, so that the transmissive display region and the reflective display region are alternately arranged in the three divided regions.

18. The liquid crystal display device of claim 15, wherein the pixel region is divided into four regions in an up/down and left/right directions, so that the transmissive display region and the reflective display region are alternately arranged in the four divided regions.

19. The liquid crystal display device of claim 14, wherein a conductor portion formed between adjacent pixel regions in one electrode substrate of the pair of electrode substrates and at least one tapered region producing a height difference between the transmissive and reflective display regions, the tapered region being formed in another electrode substrate, which faces the one electrode substrate, are arranged to overlap one another, as seen in a plan view.

20. The liquid crystal display device of claim 14, wherein the plurality of pixel regions are arranged in a matrix, the pixel regions are provided one for each region surrounded by a scanning conductor and a signal conductor, and each pixel region includes
   a transparent electrode formed in the transmissive display region,
   a reflective electrode formed in the reflective display region, and
   a transistor element that is formed near an intersection of the scanning conductor and the signal conductor and drives the transparent electrode and the reflective electrode according to a signal voltage fed from the signal conductor based on a scanning signal fed from the scanning conductor.

21. The liquid crystal display device of claim 20, wherein the transistor element is covered with the reflective electrode.

22. The liquid crystal display device of claim 20, the black matrix is formed above the scanning conductor or/and the signal conductor so as to overlap the scanning conductor or/and the signal conductor.

23. The liquid crystal display device of claim 14, wherein a width of the black matrix formed above the inter-pixel region lying between the adjacent transmissive display regions is in a range from 10 μm to 30 μm, both ends inclusive.

24. The liquid crystal display device of claim 23, wherein a width of the black matrix formed above the inter-pixel region lying between the adjacent transmissive display regions is 18 μm.

* * * * *